(12) United States Patent
Valentz

(10) Patent No.: US 6,592,093 B2
(45) Date of Patent: Jul. 15, 2003

(54) SUPPORT BASE

(75) Inventor: Arthur J. Valentz, Sugar Land, TX (US)

(73) Assignee: Portable Pipe Hangers, L.P., Houston, TX (US)

( * ) Notice: Subject to any disclaimer, the term of this patent is extended or adjusted under 35 U.S.C. 154(b) by 0 days.

(21) Appl. No.: 10/209,245

(22) Filed: Jul. 31, 2002

(65) Prior Publication Data

US 2003/0025059 A1 Feb. 6, 2003

Related U.S. Application Data

(63) Continuation-in-part of application No. 29/145,856, filed on Jul. 31, 2001, now Pat. No. 0,461,702.

(51) Int. Cl.[7] .............................................. B65D 19/00
(52) U.S. Cl. .................. 248/346.01; 248/677; 248/903
(58) Field of Search ........................ 248/346.01, 346.03, 248/903, 346.04, 49, 68.1, 125.8, 677, 678; D8/354, 398; 44/427

(56) References Cited

U.S. PATENT DOCUMENTS

| | | | |
|---|---|---|---|
| 827,575 A | 7/1906 | Smead | |
| 1,600,835 A | * 9/1926 | Manley | ........................ 269/46 |
| 4,078,757 A | 3/1978 | Waters | |
| 4,266,809 A | * 5/1981 | Wuerflein | ................ 280/766.1 |
| 4,502,653 A | 3/1985 | Curtis, Jr. | |
| 4,513,934 A | 4/1985 | Pruyne | |
| 4,515,195 A | 5/1985 | Gladstein | |
| 4,829,732 A | 5/1989 | Dahowski et al. | |
| 4,990,044 A | * 2/1991 | Kimak | ........................ 411/427 |
| 5,197,819 A | 3/1993 | Hughes | |
| 5,203,743 A | * 4/1993 | Hou et al. | ........................ 472/7 |
| 5,217,191 A | 6/1993 | Smith | |
| 5,272,869 A | * 12/1993 | Dawson et al. | ................ 60/796 |
| 5,564,669 A | 10/1996 | Wu | |
| 5,685,508 A | 11/1997 | Smith | |
| 5,728,329 A | 3/1998 | Guergov | |
| 5,743,505 A | 4/1998 | Sofy | |
| 5,816,554 A | 10/1998 | McCracken | |
| 5,829,718 A | 11/1998 | Smith | |
| 5,833,206 A | * 11/1998 | Peacock | ..................... 248/677 |
| 5,901,525 A | 5/1999 | Doeringer et al. | |
| 5,906,341 A | * 5/1999 | Brown | ........................ 248/49 |
| 5,946,867 A | 9/1999 | Snider, Jr. et al. | |
| 6,015,139 A | 1/2000 | Weber | |
| 6,017,005 A | 1/2000 | Smith | |
| D427,049 S | 6/2000 | Neider et al. | |
| D427,053 S | * 6/2000 | Nelson | ........................ D8/398 |
| 6,076,778 A | 6/2000 | Brown | |
| D433,615 S | 11/2000 | Neider et al. | |
| D435,430 S | 12/2000 | Valentz et al. | |
| 6,206,613 B1 | * 3/2001 | Elkins | ........................ 405/157 |
| 6,324,800 B1 | 12/2001 | Valentz et al. | |
| 6,367,494 B1 | * 4/2002 | Tung | ........................ 135/99 |
| D461,702 S | * 8/2002 | Valentz | ........................ D8/354 |
| D463,250 S | * 9/2002 | Valentz | ........................ D8/349 |

* cited by examiner

Primary Examiner—Ramon O. Ramirez
Assistant Examiner—Tan Le
(74) Attorney, Agent, or Firm—Brooks & Kushman P.C.

(57) ABSTRACT

A support base is disclosed for distributing a concentrated load over a generally planar surface. The support base comprises a baseplate formed of a moldable polymeric material having a top surface and a generally planar bottom surface. A tubular sleeve is formed integral with the baseplate and extends from the top surface defining an upper portion and a lower cavity portion. A cap, also formed integral with the baseplate, is oriented at the distal end of the sleeve lower cavity portion, thus defining the cavity height. A through bore is formed through the cap generally coaxial with the cavity. An array of projections, formed integral with the baseplate, extend upward from a top surface of the cap and are spaced around the through bore such that the distal ends of the projections provide a generally planar upper mounting surface.

27 Claims, 2 Drawing Sheets

SUPPORT BASE

CROSS-REFERENCE TO RELATED APPLICATIONS

This application is a continuation-in-part of U.S. application Ser. No. 29/145,856 filed Jul. 31, 2001, now U.S. Pat. No. D461.702 S issued on Aug. 20, 2002.

BACKGROUND OF THE INVENTION

1. Field of the Invention

The present invention relates to systems for supporting and hanging pipes and other loads on rooftops.

2. Background Art

It is common in a commercial industrial environment to have various operating pipes, conduits, and other equipment positioned on and extending along the ground or over the tops of roofs. For example, these pipes and conduits may be connected to an air conditioning unit positioned on a building roof.

Frequently, the pipes carry fluids which have operating temperatures fluctuating over a wide range. As the temperature of the fluids carried by the pipes changes, the pipes expand and contract accordingly. Typically, the pipes may expand and contract greatly. Therefore, the support for these pipes, as they run over the ground and/or over a roof, must sustain a pipe load, but also must be sufficiently flexible to withstand the expansion and contraction caused by fluctuations in operating parameters and the prevailing weather.

On a building roof, it was common practice for operating pipes to be supported by a series of blocks of wood spaced at intervals along the pipe track. However, the blocks would move due to the expansion and contraction of the pipes eventually causing damage to the roof. Mechanical attachment of the blocks, such as fasteners, deteriorated over time and led to leaks at the attachment holes. Another alternative was to penetrate the roof with a vehicle post which is attached to the building structure. Invariably, the seal between the roof and the post will fail, resulting in a leak.

The prior art teaches a method and apparatus for overcoming the difficulties experienced in supporting and hanging pipes. For example, U.S. Pat. No. 6,324,800 B1 issued to same assignee on Dec. 4, 2001 discloses a plastic support base and is incorporated by reference herein. This base is a non-affixed base for supporting roof top equipment, including a substantially flat bottom having a support structure rising from the base. The support base is configured for attaching a variety of interfacing bracketry and support devices thereto. Accordingly, the support base requires a plurality of recesses and configurations for receiving bracketry and support devices, and requires a plurality of relatively thick structural configurations for supporting this hardware. Although the support base provides a cost effective solution for supporting and hanging a variety of loads, the support base is relatively excessive for supporting light loads.

The prior art provides support bases for supporting relatively light roof top loads. However, these bases have complex geometries requiring large quantities of material and manufacturing time, resulting in high manufacturing costs. Further, these bases for small loads may include machined components inserted or affixed thereto, thus further increasing manufacturing costs. Additionally, these prior art support bases may require a mechanical attachment to the surface, thus leading to possible failures in the mechanical attachment and possible leaks in the roof top or similar surface.

Therefore, a need exists for a non-fixed portable base for supporting pipes and other equipment of a relatively small load, which also provides advantages of being cost effective to manufacture due to its design and the inherent geometries of the base which require minimal material and time to manufacture, and occupies a reasonable amount of floor space relative to the supported load.

SUMMARY OF THE INVENTION

An object of the present invention is to provide a support base for distributing a concentrated load over a generally planar surface. The support base includes a baseplate formed of a moldable polymeric material having a top surface and a generally planar bottom surface. At least one tubular sleeve is formed integral with the baseplate and extends from the top surface to define an upper portion and a lower cavity which is open to the bottom surface. A cap is formed integral with the baseplate and is oriented at the distal end of the sleeve lower portion, partially enclosing the cavity and defining the cavity height. A through bore is formed through the cap generally coaxial with the cavity for receiving a fastener. An array of projections, also formed integral with the baseplate, extend upward from a top surface of the cap and are spaced around the through bore to provide a generally planar mounting surface.

The above objects and other objects, features, and advantages of the present invention are readily apparent from the following detailed description when taken in connection with the accompanying drawings.

DETAILED DESCRIPTION OF THE PREFERRED EMBODIMENT(S)

Figure 1:
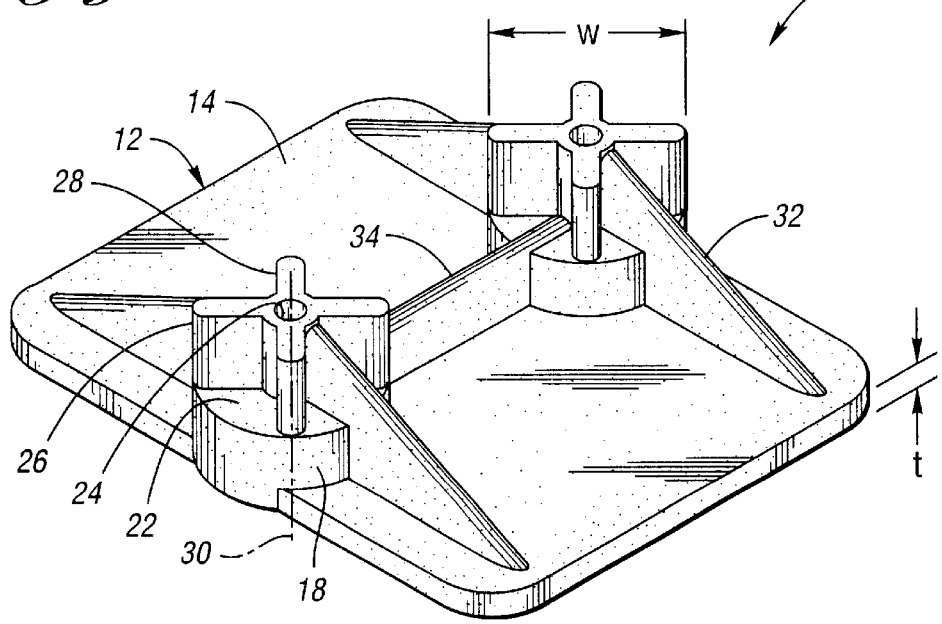
FIG. 1 is a top perspective view of a support base in accordance with the present invention.
Figure 4:
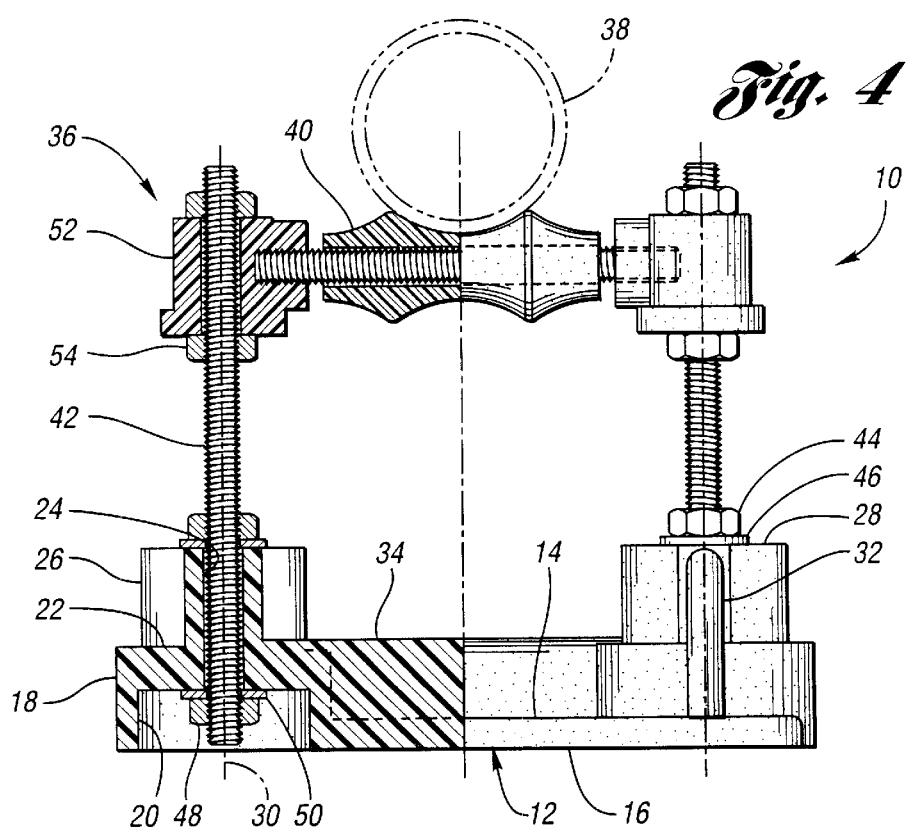
FIG. 4 is a front partial section view of the support base taken along line 4—4 of FIG. 2.

With reference to FIG. 1, there is shown a support base 10 for supporting a load and dispersing the load over a surface contact area. The support base 10 is formed of a moldable polymeric material and includes a baseplate 12 having a top surface 14 and a generally planar bottom surface 16. The baseplate 12 is provided such that the bottom surface 16 contacts a generally planar surface such as a roof top, a floor, or ground for distributing a concentrated load applied to the support base 10. Extending from the top surface 14 of the baseplate 12 are a pair of tubular sleeves 18. Each sleeve defines an upper portion and an enlarged, cup-shaped, lower cavity portion 20 as best illustrated in FIG. 4. The cavity 20 is open to the bottom surface 16. A cap 22 is oriented at the distal end of the sleeve lower cavity portion 20 such that a bottom surface of the cap 22 defines the cavity height. Each cap 22 forms a through bore 24 sized to receive a fastener, such as a threaded rod therethrough. Furthermore, an array of projections 26 extends upward from a top surface of each cap 22. The projections 26 are spaced around the through bore 24 and the distal ends of the projections 26 collectively provide a generally planar upper mounting surface 28.

A preferred embodiment of the support base 10 includes a pair of sleeves 18 as illustrated, each having the cavity 20 formed therein, the cap 22 affixed thereto, the through bore 24 formed through the cap 22 and the array of projections 26 extending from the cap 22. However, any number of sleeves 18 and corresponding features is contemplated within the scope of the invention. Accordingly, the pair of sleeves 18 and corresponding features are illustrated for securing and supporting conventional pipe support bracketry.

The support base 10 includes many features for supporting a load attached thereto, yet remaining cost effective. In order to support a load, the planar mounting surface 28 of the projections 26 is sized to support a nut and washer affixed about a fastener when received within the through bore 24. Consequently, the cavity 20 is substantially oversized relative to the through bore 24 to receive a threaded nut or a fastener head therein secured against the bottom surface of the cap 22. The cavity height is dimensioned to accommodate the height of a standard sized nut or fastener head. Each through bore 24 has a bore axis 30 oriented perpendicular to the bottom surface 16 of the baseplate 12, and the cavity 20 is generally coaxial with the bore axis 30.

In order to equally distribute a load applied to each planar mounting surface 28, the projections 26 are spaced about the through bore 24 forming a radial array converging proximate to a central region of the cap 22, thus defining a portion of the through bore 24. Moreover, the radial array of projections 26 has an overall width indicated by w in FIG. 1, which is generally equivalent to an overall width of the respective tubular sleeve 28. Therefore, an applied load is directly translated from the projections 26 to the sleeve 18, eliminating any high stress concentrations at this connection.

Although the cap 22 is illustrated as an annular ring oriented between the tubular sleeve 18 and the array of projections 26, the invention contemplates that the cap 22 may be any adequate shape for connecting the projections 26 to the sleeve 18 and for providing a lower surface which defines the height of the cavity 20. For example, if a relatively large number of projections 26 is provided, each of which directly extends from the sleeve 18, a lower region of the projections 26 would define the cap 22 oriented at the distal end of the sleeve 18 and would provide a lower surface defining the height of the cavity 20.

Any number of projections 26 is contemplated by the invention for providing the mounting surface 28. The projections 26 eliminate the conventional use of a relatively thick boss or the like. Accordingly, an adequate number of projections 26 is required for supporting a load. The preferred embodiment support base 10 is illustrated including four projections 26 in the array, spaced around the through bore 24 in a general "X"-shaped pattern. This array pattern adequately withstands applicable loads and is arranged such that the gussets 32 and web 34 may terminate proximate to the portion of the through bore 24 that is provided by the projections 26. Therefore, the gussets 32 and web 34 increase the support provided to the through bore 24 and projection array.

Due to the elevated orientation of the planar mounting surfaces 28 with respect to the baseplate 12, the support base 10 includes a plurality of gussets 32 connecting the top surface 14 of the baseplate 12 to an external surface of the tubular sleeve 18 and connecting at least one of the respective projections 26. The gussets 32 help distribute any transverse loads applied to the projections 26 and/or sleeve 18. Further, the pair of sleeves 18 are tied together by a transverse web 34. The transverse web 34 connects the top surface 14 of the baseplate 12 to each of the pair of tubular sleeves 18 for enhancing the overall rigidity of the support base 10 and assisting the displacement of applied loads.

Another aspect of the support base 10 is that the baseplate 12 has a generally uniform thickness. This generally uniform thickness results in a relatively uniform cooling of the molded part, thus reducing shrink, sink, and warpage. Shrink, sink, and warpage are difficulties commonly experienced in injection molding various components leading to internal stresses formed within a molded component. Moreover, all elements of the support base 10 are molded integrally including the baseplate 12, tubular sleeves 18, caps 22, projections 26, gussets 32 and transverse web 34, all having a generally uniform thickness. The overall generally uniform thickness of the elements of the support base 10 results in a generally uniform cooling of the molded support base 10. Further, the thicknesses of all of these elements are each not greater than the thickness of the baseplate 12 indicated by t in FIG. 1. Accordingly, the present invention is designed to avoid shortcomings experienced in the prior art by molding a base having variable thicknesses. Thus, the support base 10 of the present invention is less apt to suffer shrink, sink, and warpage. Additionally, the support base 10 has an adequate or desired strength to weight ratio such that utilization of a gas assist or other similar manufacturing processes are not necessary, thus limiting the manufacturing costs.

For illustrative purposes of the strength to weight ratio, the preferred embodiment support base 10 has dimensions of eight inches overall width by ten inches overall length, and two and one half inches overall height. The base of these dimensions does not exceed three pounds in weight including bracketry for supporting a pipe, and is capable of supporting pipe sizes up to two and one half inches in diameter.

Support base 10 may be formed from a variety of high strength low weight polymers with or without fillers or fiber reinforcement. The preferred embodiment support base 10 is manufactured of durable polypropylene. Polypropylene is inherently water resistant, thus being able to withstand outdoor conditions. As well, polypropylene has excellent strength properties to withstand loads applied thereto. Polypropylene may be enhanced with additives to resist sunlight and heat allowing the support base to be exposed to the most severe environmental conditions. Less than 5% (by weight) of the support base 10 may include a carbon black material dispersed therethrough for providing protection from ultraviolet radiation. Since weatherability of ultraviolet stabilized polypropylene varies with thickness, the amount and particle size of carbon black material required is specific to the particular thickness of the support base 10. The preferred embodiment support base 10 includes 2.5% of a carbon black material ground to a particle size between 10 to 20 millimicrons. The support base 10 also includes an anti-oxidant for processing stability and long-term heat aging stability.

Figure 2:
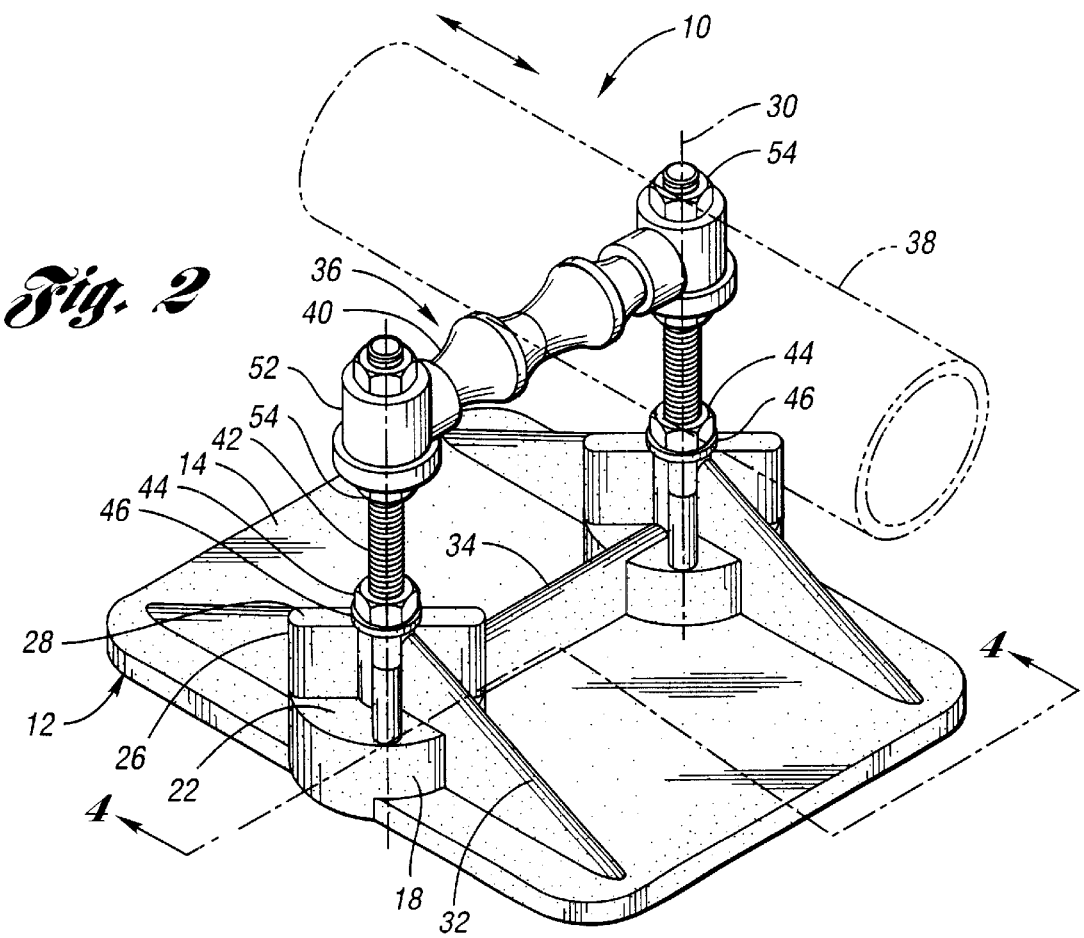
FIG. 2 is a top perspective view of the support base of FIG. 1 illustrated with hardware attached thereto for supporting a pipe.

Referring now to FIGS. 2 and 4, the support base 10 is illustrated having a load interface bracket 36 affixed thereto for transmitting a load created by a pipe 38, to the support base 10. Interface bracket 36 includes a pipe roller 40 and a pair of threaded rods 42. Pipe roller 40 supports the pipe 38 and allows the pipe 38 to move laterally (as indicated by the arrow shown) to accommodate pipe contraction and expansion. Threaded rods 42 are supported by the planar mounting surface 28 of the projections 26 and mounted thereto by upper locking nuts 44 and washers 46. Subsequently, lower locking nuts 48 and washers 50 secure the threaded rods 42 relative to the support base 10. The pipe roller 40 may be positioned vertically above support base 10 and rotatable relative thereto by rotational cooperation within roller bushings 52. Each roller bushing 52 is secured about a threaded rod 42 by a pair of locking nuts 54 fastened against a top and bottom end of each roller bushing 52.

Figure 3:
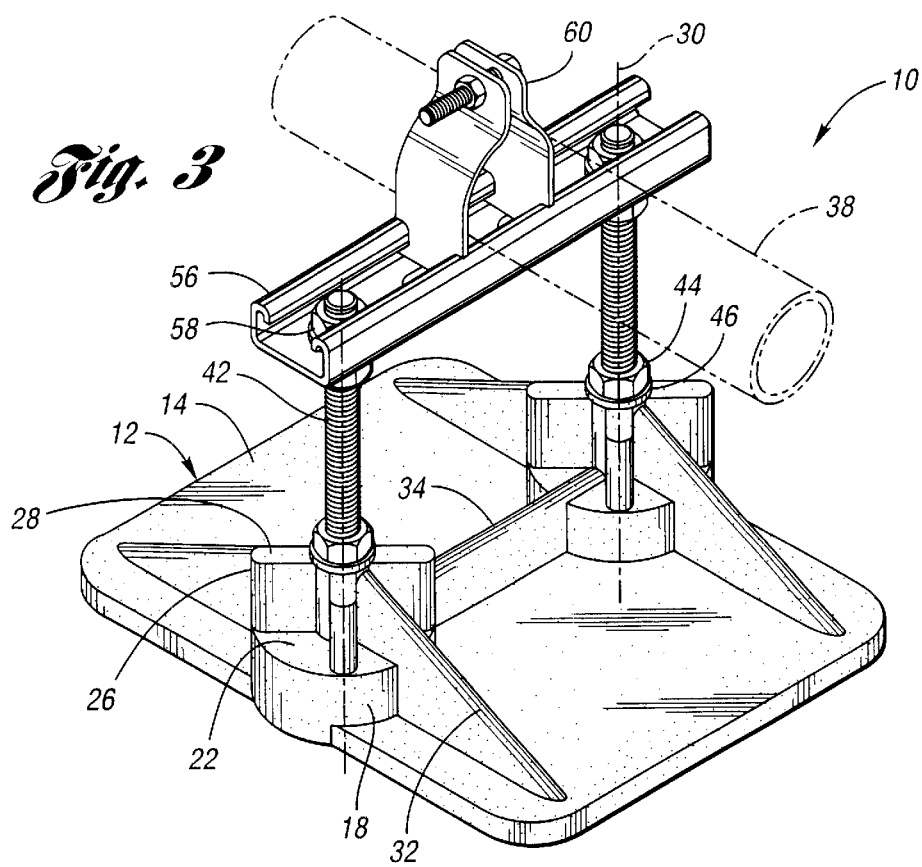
FIG. 3 is a top perspective view of the support base of FIG. 1 illustrated having alternative hardware attached thereto for supporting a pipe.

With reference to FIG. 3, support base 10 is illustrated utilizing alternative bracketry for securing and supporting the pipe 38. Similar elements retain same reference numerals wherein new elements are assigned new reference numerals. A piece of U-shaped channel 56 is affixed to threaded rods 42 by locking nuts 58 secured about each threaded rod 42 to top and bottom surfaces of the channel 56. A pipe 38 rests upon the piece of channel 56 and is secured thereto by a conventional pipe clamp 60. The pipe clamp 60 is retained within the channel 56 and is adjustable therein for transverse adjustment of the pipe orientation.

Although the support base 10 is illustrated supporting pipes, the invention contemplates that the support base 10 may support any concentrated load over a generally planar surface. For example, (as in Applicant's U.S. Pat. No. 6,324,800 B1) a foot pad may be secured to the support base for supporting a platform, equipment, steps, or the like.

In summary, the present invention offers a low weight support base that is cost effective in light of material requirements and manufacturing costs incurred, and occupies a reasonable amount of floor space while adequately supporting a concentrated load.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A support base for distributing a concentrated load over a generally planar surface, the support base comprising:
    a baseplate formed of a moldable polymeric material having a top surface and a generally planar bottom surface;
    a tubular sleeve formed integral with the baseplate, the sleeve extending from the top surface and defining an upper portion having a through bore formed therethrough sized to receive a fastener, and the sleeve defining an enlarged, cup shaped, lower cavity portion therein, open to the bottom surface and generally coaxial with the through bore;
    a cap formed integral with the baseplate, the cap being oriented at the distal end of the lower cavity portion of the sleeve, such that a bottom surface of the cap defines the cavity height and the cap forms a portion of the through bore; and
    an array of projections formed integral with the baseplate, the projections extending upward from a top surface of the cap and being spaced around the bore through the sleeve upper portion, the distal ends of the projections providing a generally planar upper mounting surface.

2. The support base of claim 1, wherein the mounting surface provided by the projections, is sized to support a nut and washer affixed about a fastener received within the through bore.

3. The support base of claim 1, wherein the cavity is substantially oversized relative to the through bore to receive a threaded nut or a fastener head therein.

4. The support base of claim 1, wherein the through bore has a bore axis oriented perpendicular to the baseplate bottom surface.

5. The support base of claim 1, wherein the array of projections form a radial array extending upward from the cap, converging proximate to the tubular sleeve upper portion.

6. The support base of claim 5, wherein the radial array of projections has an overall width generally equivalent to an overall width of the tubular sleeve.

7. The support base of claim 1, wherein the baseplate has a generally uniform thickness.

8. The support base of claim 7, wherein the sleeve, cap and projections each have a generally uniform thickness not greater than that of the baseplate.

9. The support base of claim 1, further comprising a plurality of gussets formed integral with the baseplate, each gusset connecting the top surface of the baseplate to an external surface of the tubular sleeve and at least one of the projections.

10. The support base of claim 9, wherein the gussets each have a generally uniform thickness not greater than that of the baseplate.

11. The support base of claim 1, wherein the polymeric material is further defined as polypropylene.

12. The support base of claim 11, wherein the polymeric material further comprises a fine ground carbon black material for inhibiting the effect of ultraviolet rays, the carbon black material amounting to less than five percent of the polymeric material by weight.

13. A support base for distributing a concentrated load over a generally planar surface, the support base comprising:
    a baseplate formed of a moldable polymeric material having a top surface and a generally planar bottom surface;
    a pair of spaced apart tubular sleeves formed integral with the baseplate, each sleeve extending from the top surface and defining an upper portion having a through bore formed therethrough sized to receive a fastener, and the sleeve defining an enlarged, cup shaped, lower cavity portion therein, open to the bottom surface and generally coaxial with the through bore;
    a pair of caps formed integral with the baseplate, each cap being oriented at the distal end of the lower cavity portion of one of the sleeves, such that a bottom surface of each cap defines the cavity height and each cap forms a portion of the through bore; and
    a pair of arrays of projections formed integral with the baseplate, the projections of each array extending upward from a top surface of one of the caps and being spaced around the bore through the sleeve upper portion, the distal ends of the projections of each array providing a generally planar upper mounting surface spaced apart from the respective cap.

14. The support base of claim 13, wherein the mounting surfaces provided by the projections, are each sized to support a nut and washer affixed about a fastener received within the respective through bore.

15. The support base of claim 13, wherein each cavity is substantially oversized relative to the respective through bore to receive a threaded nut or a fastener head therein.

16. The support base of claim 13, wherein each through bore has a bore axis oriented perpendicular to the baseplate bottom surface.

17. The support base of claim 13, wherein the pair of projection arrays each form radial arrays, each extending upward from one of the caps, the projections converging proximate to the tubular sleeve upper portion.

18. The support base of claim 17, wherein each radial array of projections has an overall width generally equivalent to an overall width of the respective tubular sleeve.

19. The support base of claim 13, wherein the baseplate has a generally uniform thickness.

20. The support base of claim 19, wherein the sleeves, caps and projections each have a generally uniform thickness not greater than that of the baseplate.

21. The support base of claim 13, further comprising a plurality of gussets formed integral with the baseplate, each gusset connecting the top surface of the baseplate to an external surface of one of the tubular sleeves and at least one of the respective projections.

22. The support base of claim 21, wherein the gussets each have a generally uniform thickness not greater than that of the baseplate.

23. The support base of claim 13, further comprising a transverse web connecting the top surface of the baseplate to an external surface of each of the pair of tubular sleeves, the web being formed integral with the baseplate.

24. The support base of claim 23, wherein the web has a generally uniform thickness not greater than that of the baseplate.

25. The support base of claim 13, wherein the polymeric material is further defined as polypropylene.

26. The support base of claim 25, wherein the polymeric material further comprises a fine ground carbon black material for inhibiting the effect of ultraviolet rays, the carbon black material amounting to less than five percent of the polymeric material by weight.

27. A support base for distributing a concentrated load over a generally planar surface, the support base comprising:

a baseplate formed of polypropylene with less than five percent by weight of a fine ground carbon black material, the baseplate having a top surface, a generally planar bottom surface and a generally uniform thickness;

a pair of spaced apart tubular sleeves formed integral with the baseplate, each sleeve extending from the top surface and defining an upper portion having a through bore formed therethrough, perpendicular with the baseplate and sized to receive a fastener, and the sleeve defining an enlarged, cup shaped, lower cavity portion therein, open to the bottom surface and generally coaxial with the through bore;

a pair of caps formed integral with the baseplate, each cap being oriented at the distal end of the lower cavity portion of one of the sleeves, such that a bottom surface of each cap defines the cavity height and each cap forms a portion of the through bore;

a pair of radial arrays formed integral with the baseplate, each radial array including projections extending upward from a top surface of one of the caps and converging proximate to the tubular sleeve upper portion for defining a portion of the respective through bore, the distal ends of each radial array providing a generally planar upper mounting surface sized to support a nut and washer affixed about a fastener received within the respective through bore, each radial array having an overall width generally equivalent to an overall width of the respective tubular sleeve;

a plurality of gussets formed integral with the baseplate, each gusset connecting the top surface of the baseplate to an external surface of one of the tubular sleeves and at least one of the respective projections; and a transverse web connecting the top surface of the baseplate to an external surface of each of the pair of tubular sleeves, the web being formed integral with the baseplate;

wherein the sleeves, caps, projections, gussets and web each have a generally uniform thickness not greater than that of the baseplate.

\* \* \* \* \*

UNITED STATES PATENT AND TRADEMARK OFFICE
CERTIFICATE OF CORRECTION

PATENT NO. : 6,592,093 B2
DATED : July 15, 2003
INVENTOR(S) : Arthur J. Valentz

It is certified that error appears in the above-identified patent and that said Letters Patent is hereby corrected as shown below:

<u>Title page</u>,
Item [63], Related U.S. Application Data, delete "Pat. No. 0,461,702" and insert -- Pat. No. D461,702 --.

<u>Column 1</u>,
Line 7, delete "D461.702" and insert -- D 461,702 --.

Signed and Sealed this

Fourth Day of January, 2005

JON W. DUDAS
*Director of the United States Patent and Trademark Office*